United States Patent

[11] 3,583,657

| | | | |
|---|---|---|---|
| [72] | Inventor | George Boyce |  |
| | | Slough, England | |
| [21] | Appl. No. | 784,415 | |
| [22] | Filed | Dec. 17, 1968 | |
| [45] | Patented | June 8, 1971 | |
| [73] | Assignee | M.L. Aviation Company Limited | |
| | | Slough, England | |
| [32] | Priority | Jan. 16, 1968 | |
| [33] | | Great Britain | |
| [31] | | 2367/68 | |

[54] AIRCRAFT CRASH RECORDER UNITS
5 Claims, 4 Drawing Figs.

[52] U.S. Cl. ................................................. 244/1, 9/9
[51] Int. Cl. ................................................. B64d 25/20, B63b 21/52
[50] Field of Search ........................................ 244/1; 9/9

[56] References Cited
UNITED STATES PATENTS

| 2,687,541 | 8/1954 | Bannister | 9/9X |
| 2,992,793 | 7/1961 | Devantier | 244/1 |
| 3,123,842 | 3/1964 | Oeland, Jr., et al. | 9/9 |
| 3,157,890 | 11/1964 | Mellon, Jr., et al. | 244/1X |
| 3,181,809 | 5/1965 | Lobelle | 244/1 |
| 3,465,987 | 9/1969 | Hormon et al. | 244/1 |

Primary Examiner—Milton Buchler
Assistant Examiner—Jeffrey L. Forman
Attorney—Palmer and Estabrook Kemon ABSTRACT: Apparatus for underwater ejection of a buoyant aircraft crash recorder container is described. The apparatus operates in response to a pressure corresponding to a predetermined depth of water. When a pressure sensor senses this pressure, high-pressure gas is released and ejects the crash recorder container together with a cover which normally closes an opening giving access to a space in which the container is housed.

AIRCRAFT CRASH RECORDER UNITS

This invention relates to aircraft crash recorders, that is to say apparatus which provides a record of the circumstances of an aircraft crash. This record is normally of the variation of various quantities such as control settings, instrument readings and so forth.

In the event of an aircraft ditching, that is to say making a forced landing over water, it is likely that it will eventually if not immediately sink. As a result, a crash recorder fitted in the aircraft will sink with it and if the depth of water is appreciable, it may not be possible to subsequently recover the recorder. Proposals have therefore been made for providing ejection apparatus to automatically eject the recorder, which would have a buoyant container, in the event of the aircraft ditching.

According to the present invention such apparatus has a space for housing the buoyant container accessible through an opening which is normally closed by a cover, a spring-operated device under the control of a pressure sensor which, in sensing a predetermined pressure, allows the spring-operated device to operate with the result that gas is released from a source of high-pressure gas, and a telescopic ejection device for ejecting the container through the opening together with the cover in response to the released gas. It will be understood that as the aircraft sinks, the pressure sensed by the pressure sensor, which responds to both air and water, increases until a specific pressure corresponding to a specific depth is sensed whereupon the spring-operated device operates and causes ejection of the container. One feature of this is that ejection occurs only if the specific pressure is sensed, that is only if the aircraft sinks to this depth. At least one previously proposed ejection apparatus has operated in response to impact, that is deceleration, thus resulting in ejection in the event of a crash landing with possibly dangerous consequences. Another feature is that ejection takes place whatever the attitude of the aircraft. This is acceptable from a safety viewpoint unlike a cartridge or explosive device which might otherwise be used.

Another particularly important feature is that if the pressure sensor is set so as to operate when it is only a short distance below the water level, for instance between 25 and 35 feet, the container need not have the highly stressed casing which is required to resist the high pressures at appreciable depths. Thus the container can be comparatively light in weight and have small dimensions.

By way of example, apparatus in accordance with the invention will now be described in more detail with reference to the accompanying drawings in which.

Figure 1:
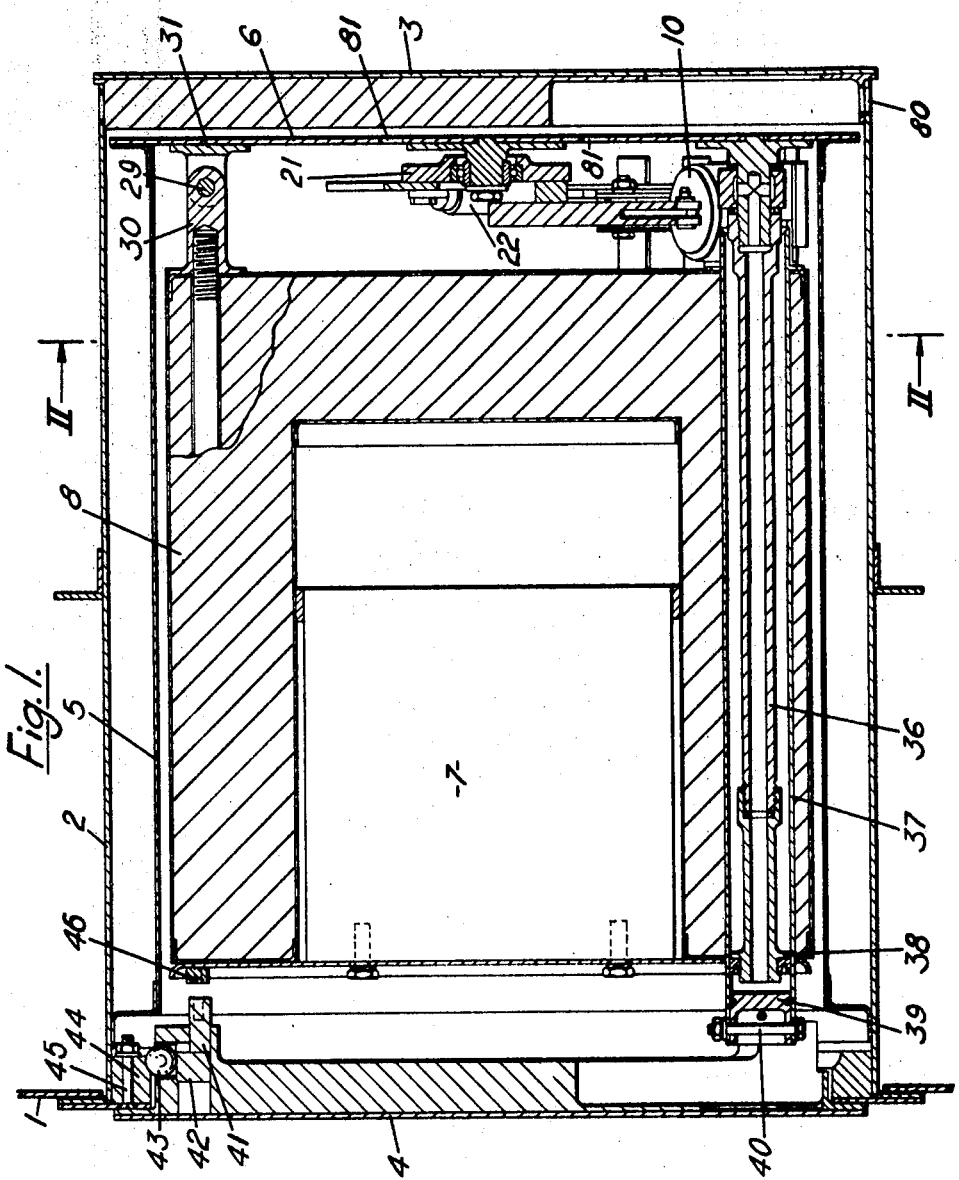
FIG. 1 is a side elevation in section of the apparatus with the crash recorder in its container in it taken along the lines I-I of FIG. 2.

Reference should first be made to FIG. 1 in which the apparatus is shown installed in an aircraft having an outer skin 1. Since the apparatus is self-contained, installation is a simple procedure merely requiring provision of an apparatus in the outer skin of the aircraft, insertion of the apparatus in the aperture and connection of the recorder input cable to the aircraft instrumentation and so forth.

The apparatus includes a tubular outer casing 2 having a closed inboard end 3 and an open outer end closed by a cover 4 substantially flush with the outer skin 1. The ejection mechanism is carried by a tubular member 5 having a closed inboard end 6 and secured within the casing 2 as will be described later. The crash recorder is indicated at 7 and its buoyant container at 8. The recorder input cable (not shown) through which information is fed to the recorder 7 includes a pair of push-bit connectors. The recorder itself is standard equipment.

Figure 2:
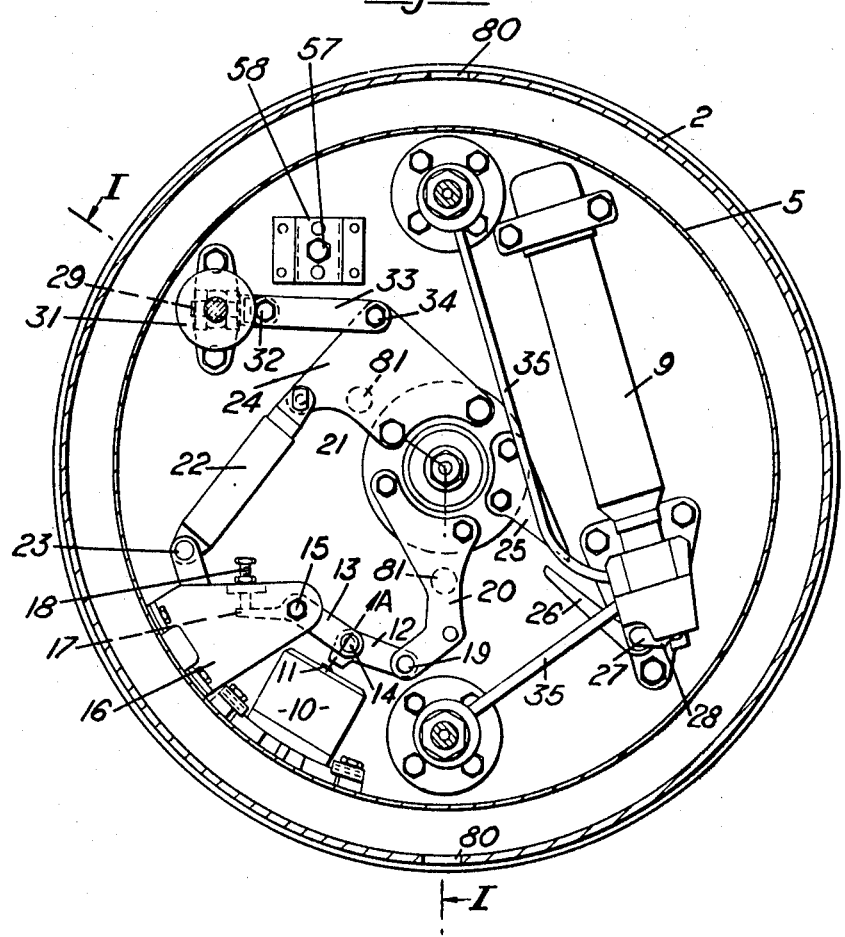
FIG. 2 is a cross section through the apparatus taken along the lines II-II of FIG. 1.

The force for ejecting the crash recorder container is produced by compressed air obtained from a cylinder 9 shown in FIG. 2 in response to operation of a pressure sensor 10. The latter will be described in more detail later but for the present it is sufficient to know that on subjection to air or water pressure, a pin 11 is moved by the pressure through a corresponding distance in the direction of the arrow A. This pin is in contact with one end of a link 12 pivoted to a link 13 at 14, the two links forming a toggle linkage. The link 13 is pivoted at 15 to a bracket 16 secured to the tubular member 5. The link 13 has a projection 17 which, as will be described later, is biassed against an adjustable screw stop 18. The other link 12 is pivoted at 19 to an arm 20 secured to a rotatably journaled plate 21. A compression spring assembly 22 is pivoted at 23 to part of the bracket 16 and at the other end to an arm or bracket 24 secured to the plate 21. In consequence, the compression spring assembly 22 tends to rotate the plate 21 in a clockwise direction. It can be seen that this action is resisted by the projection 17 of the link 13 abutting against the screw stop 18. However, if the pin 11 moves outwardly with respect to the sensor 10, that is in the direction of the arrow A, beyond a certain point which corresponds to a depth below the water surface of 30 feet, the toggle linkage formed by the links 12 and 13 is moved overcenter so that the compression spring assembly 22 is free to rotate the plate 21 in a clockwise direction. When this occurs, an arm 25 secured to the plate 21 moves into contact with one end of a lever 26 pivoted at 27 to the end wall 6. A pointed member 28 is secured to pivot with the lever 26. It can be seen that the clockwise rotation of the plate 21 results in anticlockwise pivoting of the lever 26 and the pointed member 28. In consequence, the pointed member 28 ruptures a diaphragm which normally seals the cylinder 9.

When this occurs, the compressed air is released from the cylinder 9 and ejects the crash recorder in its container 8. Before describing how this occurs, it must be explained that the rotation of the plate 21 also has the effect of releasing the crash recorder container. Up until this moment, the container is held in place within the tubular member 5 by a pin 29 extending through an aperture in a member 30 secured to the rear of the container and through apertures in a boss 31 secured to the end wall 6. This pin 29 is pivoted at 32 to a link which is in turn pivoted at 34 to the bracket 24. It can be seen that in consequence, the rotation of the plate 21 has the effect of drawing the pin 29 to the right, as shown in FIG. 2, thus disconnecting the member 30 from the boss 31 and thereby releasing the crash recorder container.

The compressed air which is released when the diaphragm of the cylinder 9 is ruptured passes along two high-pressure tubes 35 into respective identical telescopic ejection devices, one of which is shown is FIG. 1. As shown in this Figure the gas flows into a generally cylindrical space defined by a cylinder 36 secured through various intermediate components to the end wall 6. A second cylinder 37 slidably cooperates with a pistonhead 38 of the cylinder 36 and is secured within the container 8. The outer end of the second cylinder 37 is closed by a plug 39 secured in place by a bolt 40. It can be seen that the effect of the compressed air is to tend to force the cylinder 37 and thus the crash recorder container to the left, the cylinder 37 sliding over the piston head 38 as this occurs. In other words, the effect of the compressed air is to tend to eject the container.

As is clear from FIG. 1 and as has already been explained, the outer end of the apparatus is closed by the cover 4. This is normally locked in position by four identical ball locks circumferentially spaced around the edge of the cover, one being visible in FIG. 1. This lock includes an operating member in the form of a plunger 41 slidably mounted in the cover 4. A member 42 is secured to the plunger 41 and as can be seen, holds a ball 43 in contact with a block 44 which is bolted by a bolt 45 to part of the outer casing 2. The cooperation between the ball 43 and the block 44 is such that the cover is locked in place. However, if the plunger 41 and thus the member 42 is moved to the left, the ball 43 is free to move inwardly out of engagement with the block 44 with the result that the cover is unlocked. This action occurs when the crash recorder container moves to the left ejection. Four striker pads, one of which is visible at 46 are secured to the front face of the container each aligned with one of the four plungers. Thus the movement of the container to the left results in movement of the four plungers to the left thus unlocking the four ball locks and releasing the cover. Thus the cover is forced away from the aircraft as ejection takes place. The purpose of the pin 29 and the associated components is now apparent since if the container were free to move towards the cover, movement of the aircraft might result in the container unlocking the cover and falling out of the tubular member 5.

It should be noted that the cover 4 can be easily removed to gain access to the unit for servicing. This is achieved by withdrawing a locking pin (not shown) and then turning the cover 4 in an anticlockwise direction through a small angle. This has the effect of unlocking the cover, in the manner in which a bayonet coupling is unlocked, so that it can be removed. If necessary, the four bolts 45 can then be withdrawn so that the tubular member 5 and the ejection mechanism carried by it can be slid out of the casing 2.

Figure 4:
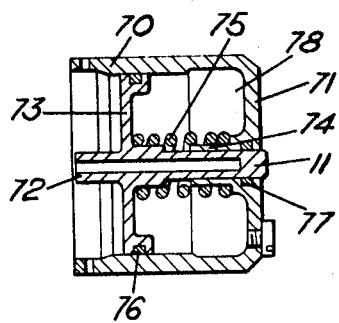
FIG. 4 is an elevation in cross section of the pressure sensor shown in FIGS. 1 and 2.

The pressure sensor 10 already referred to is shown in FIG. 4. It includes a tubular housing 70 closed at one end 71. A tubular member 72 having an integral piston 73 is slidably mounted in an internal axially extending portion 74 of the housing. The member 72 is tubular in order to keep the overall weight as small as possible. A compression spring 75 forces the tubular member 72 to the left. Seals 76 and 77 ensure that the space 78 defined by the piston 73 and the housing 70 is air and water tight.

As the aircraft in which the apparatus is installed sinks, the pressure within the aircraft increases. It will be understood that the aircraft will contain air pockets but due to the pressure equalization which will tend to occur, the air pressure in these pockets will be the same as the water pressure in the flooded parts of the aircraft. In order that this pressure increases should be sensed by the pressure sensor 10, the outer casing 2 of the ejection apparatus is provided with apertures 80 and the end 6 with apertures 81. Thus either water or pressurized air acts on the piston 73 which is thereby moved to the right against the effect of the compression spring 75 and the air in the space 78. The adjustable screw stop 18 shown in FIG. 2 has been previously adjusted so that the toggle linkage is forced overcenter by the pin 11 when a pressure corresponding to 30 feet of water is exerted on the piston 73. Accordingly ejection occurs at 30 feet in the way already described.

A pressure sensor of the same general kind just described has a number of advantages over an evacuated capsule which may alternatively be used. In particular periodic checking to ensure that the vacuum is being held is not necessary. It will be understood that if vacuum failure in a capsule occurs, the capsule will not operate. In addition the pressure sensor is simple to manufacture and its setting is not critical since operation is by means of the pressure difference. It should also be noted that it compensates for changes in pressure due to changes in altitude during flight.

Figure 3:
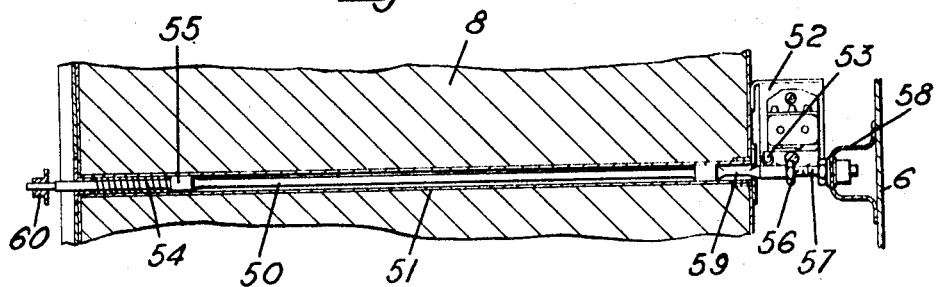
FIG. 3 is a side elevation in section of part of the crash recorder container shown in FIG. 1.

Reference should now be made to FIG. 3 in which a switch mechanism for automatically switching on a radio beacon carried by the crash recorder container is shown. This mechanism includes a rod 50 which extends along a passage 51 through the container 8. An on/off switch 52 is secured to the rear of the container and has an operating member 53. The rod 50 is sprung to the right as shown in FIG. 3 by a compression spring 54 acting against a shoulder 55 on the rod. In consequence, the right-hand end of the rod abuts against a rod 57 secured by a bracket 58 to the end wall 6. It can be seen from this that when the container is ejected, that is to say the switch 52 moves to the left, the operating member 53 moves to the left along the rod 50. This has a narrower portion 59 into which the operating member 53 moves. This action switches the radio beacon into the operating state. Subsequently the front end of the container 8 contacts a knob secured to the rod 50. Accordingly the rod 50 then moves to the left with the container.

I claim:

1. Underwater ejection apparatus for a buoyant aircraft crash recorder container, comprising:
   a pressure sensor;
   a source of high-pressure gas having a puncturable diaphragm seal;
   a spring-operated device, including a toggle linkage which is moved overcenter by said pressure sensor on sensing a predetermined pressure and a puncturing member so controlled by said toggle linkage as to move when said toggle linkage moves overcenter to puncture said diaphragm sealing said gas source and to release said gas; and
   a telescope ejection device to which said released gas flows, said ejection device thereupon ejecting said container from said apparatus.

2. Underwater ejection apparatus for a buoyant aircraft crash recorder container, comprising:
   a pressure sensor, said pressure sensor including a cylinder containing a piston which together define a closed space within said cylinder, whereby variations in pressure result in relative movement between said piston and said cylinder so as to balance consequent variations in force on said piston and said cylinder;
   a spring-operated device so controlled by said pressure sensor as to operate when a predetermined pressure is sensed;
   a source of high-pressure gas which is released by operation of said device; and
   a telescopic ejection device to which said released gas flows, said ejection device thereupon ejecting said container from said apparatus.

3. Underwater ejection apparatus for a buoyant aircraft crash recorder container, comprising;
   means defining a space for housing said container;
   a cover closing an opening giving access to said space;
   a pressure sensor;
   a source of high-pressure gas having a puncturable diaphragm seal;
   a spring-operated device, including a toggle linkage which is moved overcenter by said pressure sensor on sensing a predetermined pressure, and a puncturing member so controlled by said toggle linkage as to move when said toggle linkage moves overcenter to puncture said diaphragm sealing said gas source; and
   a telescopic ejection device to which said released gas flows, said ejection device thereupon ejecting said container and said cover from said apparatus.

4. Underwater ejection apparatus for a buoyant aircraft crash recorder container, comprising:
   means defining a space for housing said container;
   a cover closing an opening giving access to said space;
   a pressure sensor including a cylinder containing a piston which together define a closed space within said cylinder, whereby variations in pressure result in relative movement between said piston and said cylinder so as to balance consequent variations in force on said piston and said cylinder;
   a spring-operated device so controlled by said pressure sensor as to operate when a predetermined pressure is sensed;
   a source of high-pressure gas which is released by operation of said device; and
   a telescopic ejection device to which said released gas flows, said ejection device thereupon ejecting said container and said cover from said apparatus.

5. Apparatus according to claim 4, in which said means defining a space for housing said container also enclose said pressure sensor and are formed with an opening to permit the sensor to sense the external pressure.